(No Model.)
E. DALTON & J. M. McMILLAN.
AXLE AND BOX AND LUBRICATION OF SAME.
No. 540,425. Patented June 4, 1895.
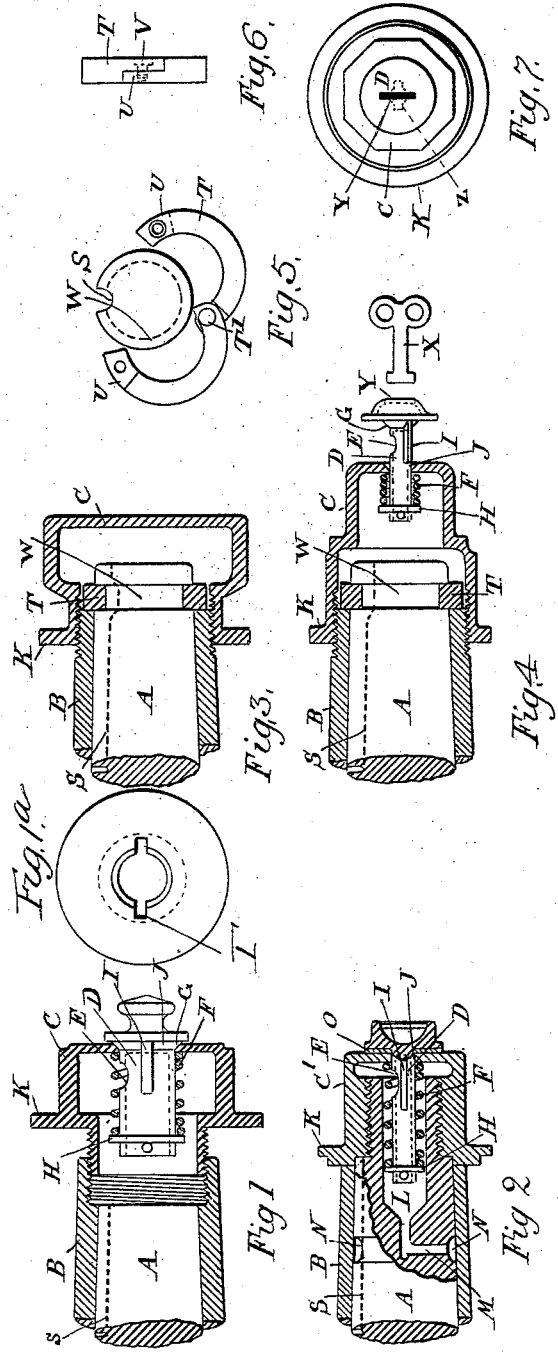
Witness:
E. K. Sturtevant
H. van Oostennee
Inventors:
Eliza Dalton
Julius Masterton McMillan

UNITED STATES PATENT OFFICE.

ELIZA DALTON, OF EAST PRAHRAN, AND JULIUS MASTERTON McMILLAN, OF HAWTHORN, VICTORIA.

AXLE AND BOX AND LUBRICATION OF SAME.

SPECIFICATION forming part of Letters Patent No. 540,425, dated June 4, 1895.

Application filed February 1, 1895. Serial No. 536,995. (No model.)

*To all whom it may concern:*

Be it known that we, ELIZA DALTON, a married woman, residing at 559 High Street, East Prahran, and JULIUS MASTERTON McMILLAN, gentleman, residing at Glenferrie Road, Hawthorn, in the Colony of Victoria, citizens of the Colony of Victoria, have invented certain new and useful Improvements in Axles and Boxes and the Lubrication of the Same, of which the following is a specification.

The objects of the invention are to dispense with the necessity of removing either the wheels or the axle caps or nuts of street or other vehicles when the axle requires lubrication and also to obviate the use of the nuts, or bolts and plates, or other means which are now employed for securing the axle boxes on the axle and in the hub of the wheel.

Referring to the drawings which form part of this specification similar letters of reference indicate similar or corresponding parts where they occur in the several views.

Figure 1 represents a view, partly in section and partly in elevation, of the lubricating-tube with a finger-knob applied to the cap of an ordinary "mail patent" axle, the tube being closed. Fig. 1ª is a face view of the cap, showing the central opening and lateral slots. Fig. 2 represents a view, partly in section and partly in elevation, of the lubricating-tube with a cross-bar as applied to a "common-nut" axle, with a capped nut, the tube also being closed. Fig. 3 represents a view, partly in elevation and partly in section, of an axle the box of which has an ordinary cap and is retained on the shaft by a divided collar fitting in a recess in the axle. Fig. 4 represents a similar axle and box to that shown in Fig. 3, except that the cap is provided with a withdrawable oil-tube removed by a key, as shown. Fig. 5 is a view of the divided collar unclasped to clear the recess in the axle end. Fig. 6 is a side view of the same clasped. Fig. 7 is a view of the face of the cap in Fig. 4, showing a keyhole on the closed end of the tube and the slots in dotted lines in the face of the cap in which the ribs slide.

In Fig. 1, A is the axle arm; B, the box; C, the cap; D, the lubricating tube; E, a round or elongated hole in it to admit oil when the tube is withdrawn; F, the spiral spring by which the seating G on the tube D is withdrawn against the corresponding seating in the cap. H is the detachable collar on the end of the tube; I, the rib or ribs; J, the central hole in the cap, and K a flange around said cap. The slots or notches through which the ribs I slide are shown at I' in Fig. 1ª and when the tube C is drawn out by the operator grasping the knob, the tube may be turned so that the ribs I will then bear against the face of the cap and be retained in place.

In Fig. 2 the capped nut c' is screwed to the end of a "common nut" axle, up the center of which is made a hole L, from which passes one more smaller hole M, conveying the oil to a shallow groove N, by which it is distributed around the interior of the box. A flat washer O of leather or other flexible material is shown beneath the head of the lubricating tube, which washer may be used in any of the illustrated combinations where found to make a better or more serviceable joint than the valve seating shown in the other views. In this modification the withdrawal tube is used as in the former case, it being of substantially the same construction.

In Fig. 3 the box B is retained on the axle A by the clamping ring T. This which is divided into two parts, and clearly shown in Figs. 5 and 6 is hinged at T', (shown in Fig. 5) the opposite joint being at U (Fig. 6). This collar may be locked, when in the groove W' which extends circumferentially about the end of the axle by a small screw V, (Fig. 6) which passes through the joints as shown. The dotted line S, represents an oil groove which is cut along the face of the axle. The screw V, in order to lock the parts of the clamp ring together, is inserted through the groove S into the openings in the parts of the clamping ring.

In Fig. 4 the tube is shown withdrawn and ready for the oil to be poured into it at E. The rib I is bearing hard against the face of the cap. X is a key which may be used to turn the tube for withdrawing it and this key fits into a key hole Y shown in Fig. 7. The dotted lines in this same figure represent the slots Z in which the ribs I slide.

Referring to Figs. 5 and 6 the halves of the collar T may be locked together by a screw or other device though such locking is not indispensable since should the screw come out or similar locking device become deranged the halves cannot leave the recess being retained in position by the interior of the cap which almost fits them. A leather washer may be used against the wearing parts similarly to those now in use.

The detachable collar H may be locked on the tube either by a split pin passing through the tube D or by any other means well known and suitable.

Having now described our invention, what we claim as new, and desire to secure by Letters Patent, is—

1. In combination the axle, the box, the cap nut inclosing the axle end and the lubricating tube extending through the cap and having a filling opening which is exposed when the tube is drawn out, substantially as described.

2. In combination, the axle, the box, the cap nut and the lubricating tube extending through the nut and having a filling opening which is exposed when the tube is drawn out, the spring for returning the tube and the guide ribs arranged to hold the tube out when turned slightly, substantially as described.

3. In combination, the axle, the box, a divided clamping ring for engaging the grooved end of the axle to hold it and the box together, the cap nut, there being an oil channel extending along the axle and opening into the cap nut past the holding ring, substantially as described.

In witness whereof we have hereunto set our hands in presence of two witnesses.

ELIZA DALTON.
JULIUS MASTERTON McMILLAN.

Witnesses:
EDWIN PHILLIPS,
CECIL W. LE PLASTRIER.